(12) United States Patent
Matt et al.

(10) Patent No.: US 10,952,370 B2
(45) Date of Patent: Mar. 23, 2021

(54) GROUND WORKING SYSTEM WITH AN ENDLESS BOUNDARY WIRE

(71) Applicant: Andreas Stihl AG & Co. KG, Waiblingen (DE)

(72) Inventors: Sebastian Matt, Kufstein (AT); Samuel Zoettl, Birgitz (AT); Peter Ritzer, Ebbs (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/004,168

(22) Filed: Jun. 8, 2018

(65) Prior Publication Data

US 2018/0352733 A1   Dec. 13, 2018

(30) Foreign Application Priority Data

Jun. 9, 2017   (EP) .................................... 17400034

(51) Int. Cl.
  *A01D 34/00*   (2006.01)
  *G05D 1/02*   (2020.01)
  (Continued)

(52) U.S. Cl.
  CPC ......... *A01D 34/008* (2013.01); *G05D 1/0088* (2013.01); *G05D 1/0265* (2013.01);
  (Continued)

(58) Field of Classification Search
  CPC ...... A01D 34/008; A01D 34/82; A01D 34/64; A01D 69/02; A01D 2101/00;
  (Continued)

(56) References Cited

U.S. PATENT DOCUMENTS

| 8,106,626 B2 | 1/2012 | Li et al. |
| 2005/0230166 A1 | 10/2005 | Petersson et al. |

(Continued)

FOREIGN PATENT DOCUMENTS

| DE | 202013101894 U1 | 9/2014 |
| DE | 102015114568 A1 | 3/2017 |

(Continued)

OTHER PUBLICATIONS

Anonymous: "Husqvarna Automower 230 ACX, Reviews—Product Review.com.au", May 18, 2016, XP055425034, pp. 1 to 10, URL:https://www.productreview.com.au/p/husqvarna-automower-230acx-220ac-210c/m/230acx.html.

(Continued)

*Primary Examiner* — Yuen Wong
(74) *Attorney, Agent, or Firm* — Walter Ottesen, P.A.

(57) ABSTRACT

A ground working system includes at least one self-driving ground working device having a drive, a control unit and a battery. An operating region is determined by a boundary wire, wherein the ground working device travels over a traveling path determined by the control unit in the operating region. Connected to the boundary wire is a first base station, which transmits a signal on the boundary wire. The electromagnetic field of the signal induces a reception signal in the reception coil of the ground working device. The reception signal is processed in the control unit. In order to make a stable signal available over the entire length of the boundary wire, it is provided that the boundary wire is electrically connected to a further base station configured as a repeater, which receives the signal transmitted by the first base station, processes it and passes it on.

10 Claims, 2 Drawing Sheets

(51) Int. Cl.
*G05D 1/00* (2006.01)
*H04B 7/155* (2006.01)
*H04W 4/021* (2018.01)
*H04W 56/00* (2009.01)
*A01B 69/04* (2006.01)
*A01D 34/64* (2006.01)
*A01D 69/02* (2006.01)
*A01D 101/00* (2006.01)

(52) U.S. Cl.
CPC ............ *H04B 7/155* (2013.01); *H04W 4/021* (2013.01); *H04W 56/001* (2013.01); *A01B 69/008* (2013.01); *A01D 34/64* (2013.01); *A01D 69/02* (2013.01); *A01D 2101/00* (2013.01); *G05D 1/0016* (2013.01); *G05D 1/0022* (2013.01); *G05D 2201/0208* (2013.01)

(58) Field of Classification Search
CPC .. G05D 1/0088; G05D 1/0016; G05D 1/0022; G05D 2201/0208; G05D 1/0265; H04B 7/155; H04W 4/021; H04W 56/001; A01B 69/008; A01B 33/106; A01B 33/16
See application file for complete search history.

(56) References Cited

U.S. PATENT DOCUMENTS

| | | | |
|---|---|---|---|
| 2011/0153172 A1 | 6/2011 | Anderson | |
| 2011/0202307 A1* | 8/2011 | Petereit | A01D 34/008 702/150 |
| 2012/0158236 A1 | 6/2012 | Chung et al. | |
| 2013/0006418 A1* | 1/2013 | Tian | A47L 9/2805 700/245 |
| 2014/0324246 A1 | 10/2014 | Biber et al. | |
| 2015/0328775 A1* | 11/2015 | Shamlian | B25J 9/1676 700/258 |
| 2016/0014955 A1 | 1/2016 | Hans | |
| 2017/0020064 A1 | 1/2017 | Doughty et al. | |
| 2017/0215336 A1 | 8/2017 | Andriolo et al. | |
| 2018/0255704 A1 | 9/2018 | Kamfors et al. | |
| 2018/0303031 A1 | 10/2018 | Araki et al. | |
| 2018/0352728 A1 | 12/2018 | Ritzer et al. | |
| 2018/0352729 A1 | 12/2018 | Matt et al. | |
| 2018/0352734 A1 | 12/2018 | Matt et al. | |
| 2018/0353040 A1 | 12/2018 | Matt et al. | |

FOREIGN PATENT DOCUMENTS

| | | |
|---|---|---|
| EP | 1906205 A1 | 4/2008 |
| EP | 1933467 A2 | 6/2008 |
| EP | 2269433 A1 | 1/2011 |
| EP | 2390741 A2 | 11/2011 |
| EP | 2656718 A1 | 10/2013 |
| EP | 2658073 A1 | 10/2013 |
| EP | 2667271 A1 | 11/2013 |
| EP | 2945037 A2 | 11/2015 |
| EP | 3069593 A1 | 9/2016 |
| WO | 03104908 A1 | 12/2003 |
| WO | 2013/141206 A1 | 9/2013 |
| WO | 2014158060 A1 | 10/2014 |
| WO | 2015072897 A1 | 5/2015 |
| WO | 2016102143 A1 | 6/2016 |
| WO | 2016103068 A1 | 6/2016 |
| WO | 2016178616 A1 | 11/2016 |
| WO | 2018060966 A1 | 4/2018 |

OTHER PUBLICATIONS

Anonymous: "Rasenmaeher Roboter Signalverstaerker", May 17, 2016, XP055425027, pp. 1 to 7, URL:https://web.archive.org/web/20160517003655/http://robomaeher.de/blog/rasenmaher-roboter-signalverstarker/.

* cited by examiner

GROUND WORKING SYSTEM WITH AN ENDLESS BOUNDARY WIRE

CROSS REFERENCE TO RELATED APPLICATION

This application claims priority of European patent application no. 17 400 034.9, filed Jun. 9, 2017, the entire content of which is incorporated herein by reference.

FIELD OF THE INVENTION

The invention relates to a ground working system including at least one self-driving ground working device, wherein the ground working device has a drive, a control unit and a battery for supplying energy to the ground working device. The ground working device operates within an operating region, which is surrounded by a boundary wire. Within the operating region, the ground working device travels along a traveling path determined by a control unit.

BACKGROUND OF THE INVENTION

The ground working system has at least one first base station, which is electrically connected to the boundary wire and generates a signal which is transmitted on the boundary wire. The electromagnetic field of the wire signal induces in a reception coil of the ground working device a reception signal, which is processed in the control unit of the ground working device and used for determining the traveling path.

Bounding the operating region by a boundary wire has proven successful in practice. Increasingly larger operating regions are delimited in a functionally reliable way by a boundary wire and, in such an enclosed operating region, not just a single ground working device but multiple ground working devices are operated. However, because of the technical and physical conditions, the maximum possible length of a boundary wire laid in a wire loop is limited. If the boundary wire is made longer, a very strong signal must be transmitted, with which proper control of the ground working devices is reliably possible even in regions away from the base station. When operating a ground working system, legal requirements also have to be met. For instance, the transmitted signals cannot be of any strength whatsoever, since their electromagnetic field may impair the function of other, for example adjacent, ground working systems.

SUMMARY OF THE INVENTION

It is an object of the invention to provide a wire loop of a boundary wire configured in such a manner that a functionally more reliable operation of a ground working device is possible even in regions far away from the base station.

The object can, for example, be achieved via a ground working system having: at least one self-driving ground working device having a drive, a control unit and a battery for supplying energy to the at least one self-driving ground working device; a boundary wire enclosing an operating region (A); the at least one self-driving ground working device being configured to travel along a traveling path (W) determined by the control unit in the operating region (A); at least one first base station electrically connected to the boundary wire and configured to generate a signal; the signal being configured to induce a reception signal in the at least one self-driving ground working device; the at least one self-driving ground working device being configured to process the reception signal; a further base station electrically connected to the boundary wire; and, the further base station being configured as a repeater which receives the signal transmitted by the first base station, processes the signal and passes on the signal.

The boundary wire is electrically connected to a further base station, this further base station being configured as a repeater. The further base station will receive the signal transmitted by the first base station on a feeding section of wire, process it and transmit it on a forwarding section of wire of the wire loop. It is sufficient to transmit a signal with low strength on the section of wire up to the further base station, so that interference with the neighbouring ground working systems can be reliably avoided.

The length of the section of wire between the first base station as a MASTER and the further base station as a SLAVE can be configured such that there is over the entire length of the section of wire a signal of sufficient signal strength and/or signal shape that ensures faultless control of the ground working devices over the entire length of the section of wire.

After a first further base station as a SLAVE, any number of further base stations may be looped into the wire loop of the boundary wire as further SLAVES, the length of the sections of wire between the base stations being chosen in each case in such a way that faultless control of the ground working devices is ensured in the region of the successive sections of wire following one after the other.

The use of further base stations as SLAVES allows the signals to be "repeated" as often as desired, so that theoretically a wire loop with an unlimited overall length is possible. The arrangement of further base stations as repeaters has the effect that the signal transmitted for controlling the ground working devices can be reliably received in the entire operating region.

In a simple embodiment, the wire loop is laid with at least one interruption. The interrupted wire loop forms at the location of the interruption an electrical disconnection point. The connection ends of the disconnection point are electrically connected to one another by a transmission/reception unit of the base station operating as a repeater, so that the wire loop is electrically contacted over its entire length.

In the further base station operating as a repeater, the transmission/reception unit receives the transmitted signal via a feeding section of wire of the boundary wire, and processes it electrically in order to transmit it further as a processed electrical signal via a forwarding section of wire of the boundary wire.

In a first form of the processing of the received signal, its amplitude may be electrically boosted. Alternatively or in addition, the further base station may also process the received signal in its signal shape.

The transmission/reception unit of a further base station is formed by a reception unit and a transmission unit. In an easy way, it is possible at a base station for example to operate a switch in order to operate the base station as "MASTER" or "SLAVE", advantageously in the operating mode of a repeater.

Advantageously, the base station automatically decides electronically whether it is operated as a SLAVE or MASTER. Thus, by way of example, when switching on the base station it may be checked whether there is a signal at the reception unit. If there is no signal at the reception unit of the base station, the base station will operate as a MASTER and transmit a predetermined, in particular stored signal to the boundary wire by way of a transmission unit of the base station.

If, on the other hand, when the base station is put into operation there is an input signal at the reception unit of the base station, the base station will take up its operation as a SLAVE and process the signal received at the reception unit of the base station and transmit it further as a processed signal to the boundary wire. This operation of the base station is also referred to as repeater operation.

In a preferred configuration of the ground working system, it is provided that all of the base stations of the ground working system are configured identically.

Within the ground working system, it is also provided that the first base station and/or the further base stations are configured as a charging station for the battery of the ground working device.

A preferred embodiment of the ground working device is the configuration as a self-driving lawnmower.

For stable operation of the ground working system, it is envisaged in particular to synchronize the signal transmitted by the further base station via the forwarding section of wire temporally with the signal received via the feeding section of wire. A ground working device within the operating region only ever receives a transmitted signal of the wire loop. Independently of the location of the reception, the received signals are temporally synchronized.

Further advantageous embodiments of the invention are provided by any desired combination of the features specified and the embodiments described.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
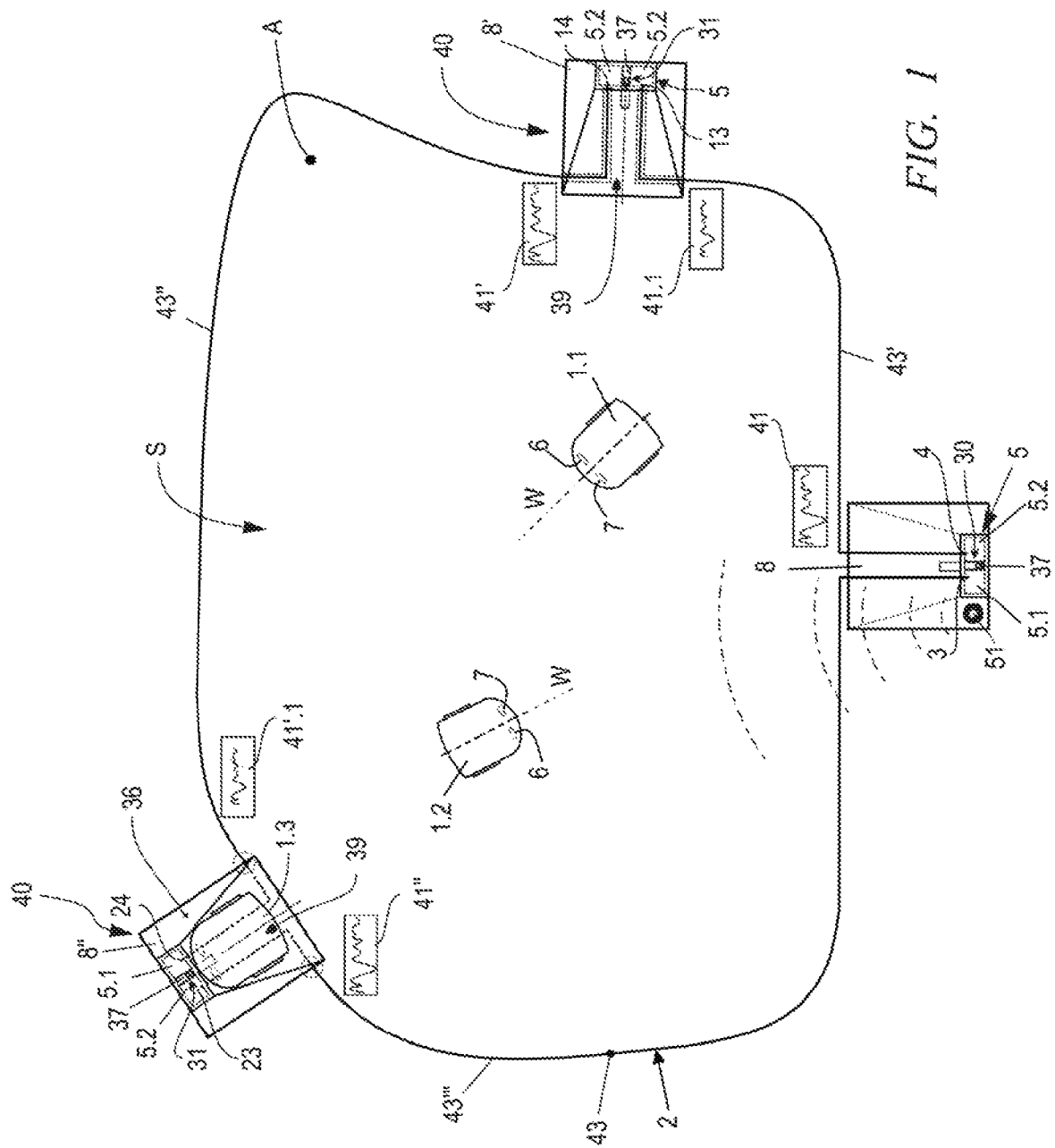
FIG. 1 shows in a schematic representation a ground working system with at least one ground working device driving itself in an operating region; and, FIG. 2 shows in a schematic representation the construction of a ground working device in the example of a self-driving lawnmower.

The ground working system S represented in FIG. 1 includes at least one self-driving ground working device 1.1, 1.2 or 1.3 for working a predetermined operating region A. In the embodiment, multiple, in particular three, ground working devices 1.2, 1.2 and 1.3 for working the predetermined operating region A in a combined manner are shown. The ground working system S may include fewer or more ground working devices. Each individual ground working device 1.1, 1.2 and 1.3 operates autonomously and travels automatically within the operating region A along a random, predetermined or automatically planned traveling path W.

In the embodiment shown, as in FIG. 1, the operating region A of the ground working system S is determined by a boundary wire 43. The wire boundary 43 shown is laid as a wire loop 2, which is in particular multiply interrupted, the primary ends 3 and 4 of the boundary wire 43 being connected to a base station 8. The base station 8 transmits—preferably at fixed time intervals—an electrical signal 41 onto the boundary wire 43. The electrical signals 41 transmitted on the boundary wire 43 are received by reception coils 6 and 7 of a ground working device 1.1 to 1.3 traveling in the operating region A.

Figure 2:
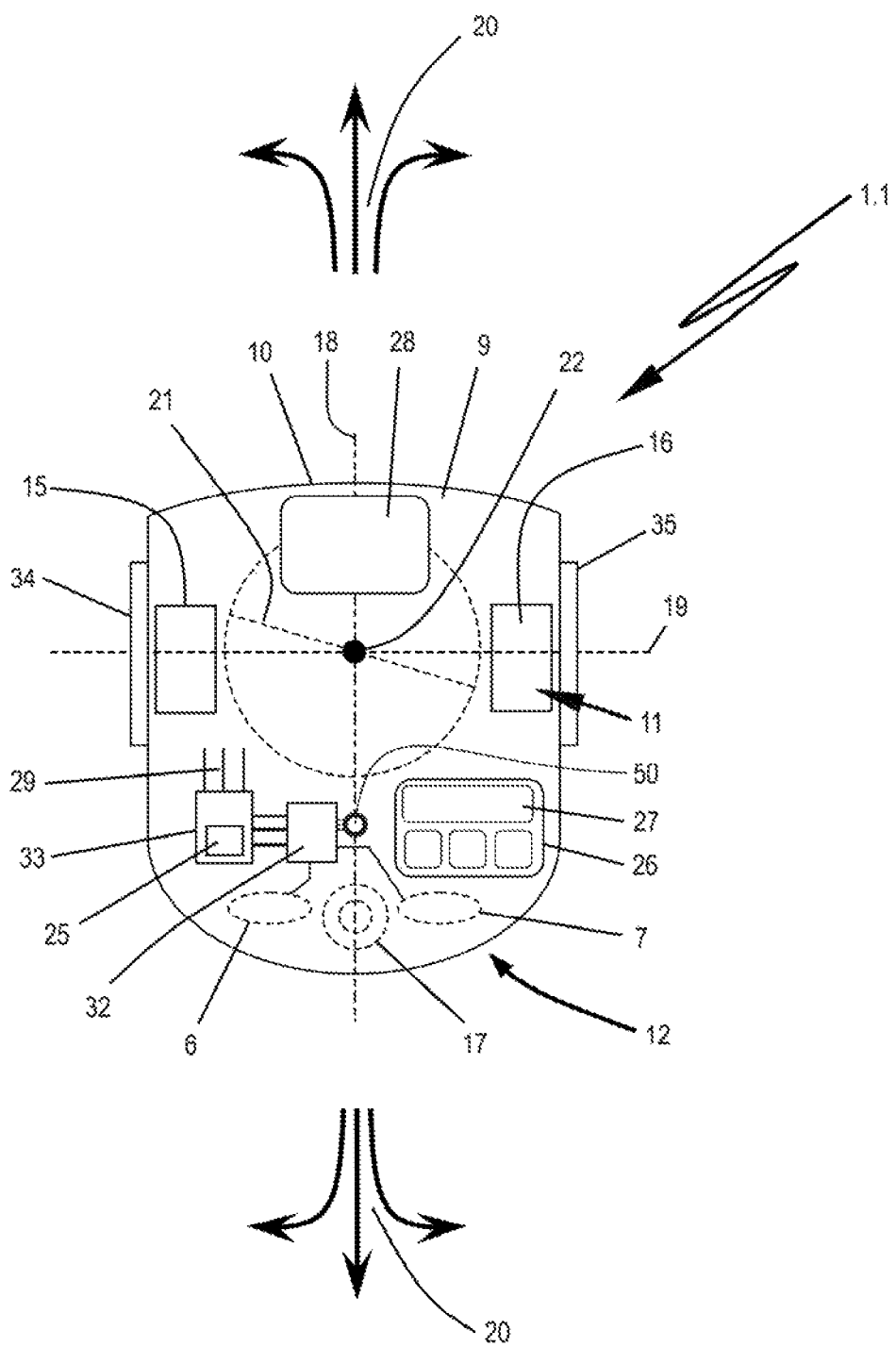

Schematically shown in plan view in FIG. 2 is a ground working device 1.1, which is configured as a lawnmower 10. The representation of the autonomously operating, self-driving lawnmower 10 is given by way of example. The ground working device 1.1 may also be configured as a scarifier, road sweeper, vacuum cleaner, autonomous ride-on lawnmower or similar ground working device.

The ground working device 1.1 shown as a lawnmower 10 in FIG. 2 essentially includes a chassis with rear drive wheels 34, 35 and a drive 11. In the embodiment shown, each drive wheel 34, 35 is assigned an electrical drive motor 15, 16, so that the drive wheels 34 and 35 can be driven at different rotational speeds and/or in different directions of rotation for controlling the direction of the lawnmower 10. The drive 11 has two mutually independently controllable electric motors.

Provided in the front region 12 of the housing 9 of the lawnmower 10, there is an in particular self-aligning third wheel 17. The third wheel 17 preferably lies on a longitudinal mid-axis 18 of the housing 9 of the ground working device 1.1. The configuration of a chassis frame with four wheels may be expedient. The drive wheels 34, 35 of the ground working device 1.1 shown rotate about a common drive axis 19. The drive axis 19—in the plan view of the lawnmower 10 as in FIG. 2—is in particular perpendicular to the longitudinal mid-axis 18 of the housing 9. For traveling in a straight line, the drive wheels 34 and 35 are to be driven synchronously via their electrical drive motors 15 and 16. For negotiating a curve, the drive wheels 34 and 35 are driven for example with different rotational speeds by their drive motors 15 and 16. By means of the drive 11, the ground working device 1.1 can be moved in any desired traveling direction 20 forward or backward according to the arrows depicted. In the embodiment as in FIG. 2, the ground working device 1.1 has an operating tool 21 between the drive wheels 34, 35. In the embodiment as a lawnmower 10, the operating tool 21 is a blade rotating about a vertical rotation axis 22.

The control of the electrical drive motors 15 and 16 is carried out via a control unit 33, which is connected via schematically indicated electrical lines 29 to the electrical drive motors 15 and 16.

The signal 41 transmitted on the wire loop 2 of the boundary wire 43 is received in the reception coils 6 and 7 of the ground working device 1.1. The reception coils 6 and 7 lie in the front region 12 of the housing 9, respectively on one side of the longitudinal mid-axis 18 of the ground working device 1.1. The reception signals induced in the reception coils 6 and 7 are delivered to a common evaluation unit 32, which is connected to the control unit 33.

Advantageously, the control unit 33 includes a memory 25 for an operating variable, which is expedient for operating the ground working device 1.1. Such an operating variable may be for example the start time of the operation, the duration of the operation, the cutting height (in the case of a configuration as a lawnmower), the traveling distance to a charging station, a mowing schedule as a weekly schedule or a similar operating variable.

As FIG. 2 shows, an input pad 26, which advantageously has a screen 27 and input keys, is provided for the user to enter information about the operating variable. It may be expedient to configure the screen as a touchscreen, so that it is possible to dispense with input keys.

A ground working device 1.1 may also have an additional receiver 50, which communicates wirelessly with a station transmitter 51, for example of the base station 8. The station transmitter 51 communicates via the receiver 50 with each individual ground working device 1.1, 1.2 and 1.3. In this case, not only can data be transmitted from the station transmitter 51 to the receiver 50; expediently, the station transmitter 51 is configured as a transmitter/receiver and the receiver 50 of the ground working device 1.1 is configured as a transmitter/receiver, so that communication from the station transmitter 51 to the receiver 50 and also from the receiver 50 to the station transmitter 51 is possible. This wireless communication connection between a station transmitter 51 and a receiver 50 is advantageously configured as a radio link or the like. Possible radio links may be WLAN connections, Bluetooth connections, GSM connections, NFC connections, infrared connections or similar wireless connections. An infrared connection may also be expedient.

The electrical supply to the control unit 33 and to all its components, the electrical supply to the electrical drive 11 and also the electrical supply to the receiver 50 is ensured by an in-device battery 28 of the ground working device 1.1. The battery 28 is preferably inserted in the housing 9 of the ground working device 1.1.

During the operation of the ground working system S, the ground working devices 1.1, 1.2 and 1.3 are made to travel independently of one another in the operating region A to be worked, as a result of corresponding control of the drive motors 15 and 16. Each individual ground working device 1.1, 1.2 and 1.3 operates autonomously in accordance with the information of an operating variable in its memory 25. Each individual ground working device 1.1, 1.2 and 1.3 autonomously travels within the operating region A automatically along a random, predetermined or automatically planned traveling path W.

The boundary wire 43, laid as a closed wire loop 2, has over its length at least one disconnection point 39. In the embodiment shown as in FIG. 2, two disconnection points 39 are formed in the wire loop 2.

At the first disconnection point 39, the boundary wire 43 is mechanically separated, so that connection ends 13 and 14 are obtained. At the disconnection point 39, a first further base station 8' is provided, formed with a transmission/reception unit 5. The connection end 13 of the feeding section of wire 43' is connected to a reception unit 5.1 of the transmission/reception unit 5. Via the feeding section of wire 43', the reception unit 5.1 is electrically connected to the first base station 8.

The second connection end 14 is provided on a forwarding section of wire 43", which is connected to a transmission unit 5.2 of the transmission/reception unit 5. The transmission unit 5.2 forwards a processed signal 41' on the forwarding section of wire 43" of the wire loop 2 of the boundary wire 43.

At the second disconnection point 39, a further base station 8" is arranged. The further disconnection point 39 is formed by an electrical separation of the boundary wire 43, whereby the connection ends 23 and 24 are obtained. The connection end 24 of the second disconnection point 39 is formed on the feeding section of wire 43" and is connected to a reception unit 5.1 of a transmission/reception unit 5. Consequently, the transmission unit 5.2 of the first further base station 8' is in connection with the reception unit 5.1 of the second further base station 8" via the section of wire 43". The other connection end 23 of the disconnection point 39 is formed on the forwarding section of wire 43'" and is connected to a transmission unit 5.2 of the second further base station 8". In the embodiment shown, the transmission unit 5.2 of the second further base station 8" is connected to the transmission/reception unit 5 of the base station 8 via the section of wire 43'". The wire loop 2 including the sections of wire 43', 43" and 43'" is closed.

Advantageously, all of the base stations 8, 8', 8" of the wire loop 2 are configured identically. Each base station 8, 8', 8" has a transmission/reception unit 5 including a reception unit 5.1 and a transmission unit 5.2. In order to operate a base station as a MASTER or as a SLAVE, a switch 37 may be expediently provided. If the switch is in switch position 30, the base station is operated as a MASTER, as for example the base station 8. In order to operate a base station as a SLAVE, the switch 37 should be adjusted to switch position 31, as for example the base stations 8' and 8".

Advantageously, a base station 8, 8', 8" is configured in such a way that the base station 8, 8', 8" automatically decides whether it is operated as a SLAVE or MASTER. Thus, by way of example, when switching on the base station 8, 8', 8" it may be checked by the transmission/reception unit 5 whether there is a signal 41 at the reception unit 5.1. If there is no signal at the reception unit 5.1 of the base station 8, 8', 8", the base station 8, 8', 8" is operated as a MASTER and transmits a predetermined, in particular stored signal 41 to the boundary wire 43 via a transmission unit 5.2 of the base station 8, 8', 8".

If, on the other hand, when a base station 8, 8', 8" is put into operation there is an input signal at the reception unit 5.1 of the base station 8, 8', 8", the base station 8, 8', 8" will take up its operation as a SLAVE and process the signal received at the reception unit 5.1 of the base station 8, 8', 8" and transmit it further as a processed signal 41 to the boundary wire 43. This operation of the base station 8, 8', 8" is also referred to as repeater operation.

It may in this case also be provided that the first base station 8 and the further base stations 8', 8" are also configured as charging stations 36, via which the battery 28 of the ground working device 1.1, 1.2 or 1.3 is charged. In FIG. 1, the ground working device 1.3 is shown in its charging position in the charging station 36 of the base station 8".

According to an aspect of the invention, it is provided that the first base station 8 operates in the position 30 as a MASTER, while the further base stations 8' and 8" in the switch position 31 are operated as a SLAVE. In this case, the configuration is provided such that the further base stations 8' and 8" switched as SLAVES are operated as repeaters 40. In the repeater operating mode, the received signal 41.1, 41'.1 is processed and subsequently transmitted further.

The transmission unit 5.2 of the base station 8 transmits to the end 4 of the wire loop 2 a signal 41, which is transmitted via the section of wire 43' of the boundary wire 43 to the further base station 8'. The signal 41 transmitted in the first further base station 8' via the feeding section of wire 43' is received as signal 41.1 by the reception unit 5.1 of the further base station 8'. This further base station 8' operates as a repeater 40 and will process the signal 41 transmitted by the first base station 8 and, via the transmission unit 5.2, transmit it further as a processed signal 41' on the forwarding section of wire 43" of the boundary wire 43 of the wire loop 2. The processed signal 41' is carried via the forwarding section of wire 43" of the boundary wire 43 to the second further base station 8" and is received there in the reception unit 5.1. In the transmission/reception unit 5 of the second further base station 8", the received signal 41'.1 is processed and, via the transmission unit 5.2, output again onto a forwarding section of wire 43'" of the boundary wire 43 of the wire loop 2. The processed signal 41" transmitted by the second, further base station 8" is returned to the base station 8 via the section of wire 43'" of the boundary wire 43'".

In the further base stations 8' and 8", the respectively received signal 41.1 or 41'.1 can be boosted, in order to transmit a uniformly strong signal 41, 41' and 41" over the entire length of the boundary wire 43. The received signal 41.1 or 41'.1 may be electrically boosted in its amplitude. Expediently, the received signal 41.1, 41'.1 is additionally or alternatively processed in its signal shape and boosted.

The arrangement of one base station 8 as a MASTER and at least one further base station 8' and 8" as a SLAVE in the operating form REPEATER provides the user with the theoretical possibility of laying a wire loop 2 of an unlimited overall length. Over the course of the wire loop 2, at suitable points disconnection points 39 are provided and further base stations 8', 8" are looped in. These further base stations 8', 8" are preferably operated exclusively as repeaters 40, that is, they receive the signal 41, 41' transmitted on the feeding section of wire 43' or 43", process it and pass it on as a signal expediently processed in amplitude and/or signal shape over a forwarding section of wire 43", 43'". Theoretically, the formation of a wire loop 2 of any desired overall length is thus possible.

For carrying out a suitable mowing schedule, the ground working devices 1.1, 1.2, 1.3 may communicate with an external server or the like via a receiver 50. By transmitting and receiving data, each individual ground working device 1.1, 1.2 and 1.3 notifies a central station for example of the progress made in work, the traveling distances it has covered and/or its electrical loading. The central station can thus control each individual ground working device 1.1, 1.2, 1.3 in a specifically directed manner and optimize the overall operating time for working the operating region A.

It is understood that the foregoing description is that of the preferred embodiments of the invention and that various changes and modifications may be made thereto without departing from the spirit and scope of the invention as defined in the appended claims.

What is claimed is:

1. A ground working system comprising:
   at least one self-driving ground working device having a drive, a control unit and a battery for supplying energy to said at least one self-driving ground working device;
   a boundary wire enclosing an operating region (A);
   said at least one self-driving ground working device being configured to travel along a traveling path (W) determined by said control unit in said operating region (A);
   at least one first base station electrically connected to said boundary wire at a first location thereon and configured to generate a signal on said boundary wire;
   said boundary wire signal being configured to induce a reception signal in said at least one self-driving ground working device;
   said at least one self-driving ground working device being configured to process said reception signal;
   a further base station electrically connected to said boundary wire at a second location thereon spaced from said first location;
   said further base station being configured as a repeater which receives said boundary wire signal transmitted by said at least one first base station on said boundary wire, processes said boundary wire signal and passes on said boundary wire signal;
   wherein said at least one first base station and said further base station each have a transmission/reception unit corresponding with a reception unit and a transmission unit;
   wherein one of said at least one first base station and said further base station operates as a master;
   wherein another one of said at least one first base station and said further base station operates as a slave;
   wherein said boundary wire is laid as a wire loop which is interrupted once for the electrical connection of the one of said at least one first base station as the master and a further time for the electrical connection to said further base station as the slave; and,
   wherein at least one of said at least one first base station and said further base station are configured as a charging station for the battery of said at least one self-driving ground working device.

2. The ground working system of claim 1, wherein:
   said wire loop has at least one electrical disconnection point with connection ends; and,
   said connection ends of said disconnection point are electrically connected by said transmission/reception unit in said further base station.

3. The ground working system of claim 2, wherein:
   said transmission/reception unit of said further base station is configured to receive said boundary wire signal via a section of wire of said boundary wire and to transmit said boundary wire signal further as a processed electrical signal.

4. The ground working system of claim 1, wherein:
   said further base station receives said boundary wire signal as a received signal having an amplitude via a section of wire of said boundary wire; and,
   said further base station is configured to electrically boost said amplitude of said received boundary wire signal.

5. The ground working system of claim 1, wherein:
   said further base station receives said boundary wire signal as a received signal having a signal shape via a section of wire of said boundary wire; and,
   said further base station is configured to process said signal shape of said received boundary wire signal.

6. The ground working system of claim 1, wherein:
   one of said at least one first base station and said further base station operates as a master and transmits a predetermined boundary wire signal to said boundary wire via said transmission unit of the corresponding transmission/reception unit if there is no input signal at said reception unit of said at least one corresponding transmission/reception unit.

7. The ground working system of claim 1, wherein:
   one of said at least one first base station and said further base station operates as a slave and repeater if there is an input signal at said reception unit of the corresponding transmission/reception unit; and,
   said transmission unit of the corresponding transmission/reception unit is configured to process said input signal and transmit said input signal to the boundary wire as a processed boundary wire signal.

8. The ground working system of claim 1, wherein all of said at least one first base station and said further base station of the ground working system (S) are configured identically.

9. The ground working system of claim 1, wherein, said at least one self-driving ground working device is a self-driving lawnmower.

10. The ground working system of claim 1, wherein:
    said further base station receives said signal as a received boundary wire signal; and,
    said further base station is configured to temporally synchronize said boundary wire signal transmitted by said at least one first base station with said received boundary wire signal.

* * * * *